United States Patent

[11] 3,579,006

| [72] | Inventors | Fred H. Kindl<br>Schenectady;<br>Sterling C. Barton, Scotia, N.Y. |
|---|---|---|
| [21] | Appl. No. | 878,746 |
| [22] | Filed | Nov. 21, 1969 |
| [45] | Patented | May 18, 1971 |
| [73] | Assignee | General Electric Company |

[54] LIQUID COOLED COLLECTOR RINGS FOR DYNAMOELECTRIC MACHINE
5 Claims, 5 Drawing Figs.

[52] U.S. Cl.............................................. 310/227,
310/54, 310/60, 310/232
[51] Int. Cl...................................................... H02k 9/28,
H02k 39/00
[50] Field of Search........................................... 310/219,
227, 178, 239, 232, 60, 61, 50, 54, 58

[56] References Cited
UNITED STATES PATENTS

| 2,950,403 | 8/1960 | Kilner et al. .................. | 310/227X |
| 3,145,314 | 8/1964 | Becker ......................... | 310/61X |
| 3,469,127 | 9/1969 | Eggemann et al. ........... | 310/61X |

*Primary Examiner*—Milton O. Hirshfield
*Assistant Examiner*—Mark O. Budd
*Attorneys*—William C. Crutcher, Frank L. Neuhauser, Oscar B. Waddell and Joseph B. Forman

ABSTRACT: In a dynamoelectric machine of the type having brushes transmitting current to a shaft-mounted collector ring, the improvement consists of a liquid dam on one end of the overhanging ring and means to supply liquid into the rotating cavity and collect liquid from the cavity so as to cool the ring and increase the current-transmitting capacity of the brushes.

Patented May 18, 1971
3,579,006
2 Sheets-Sheet 1
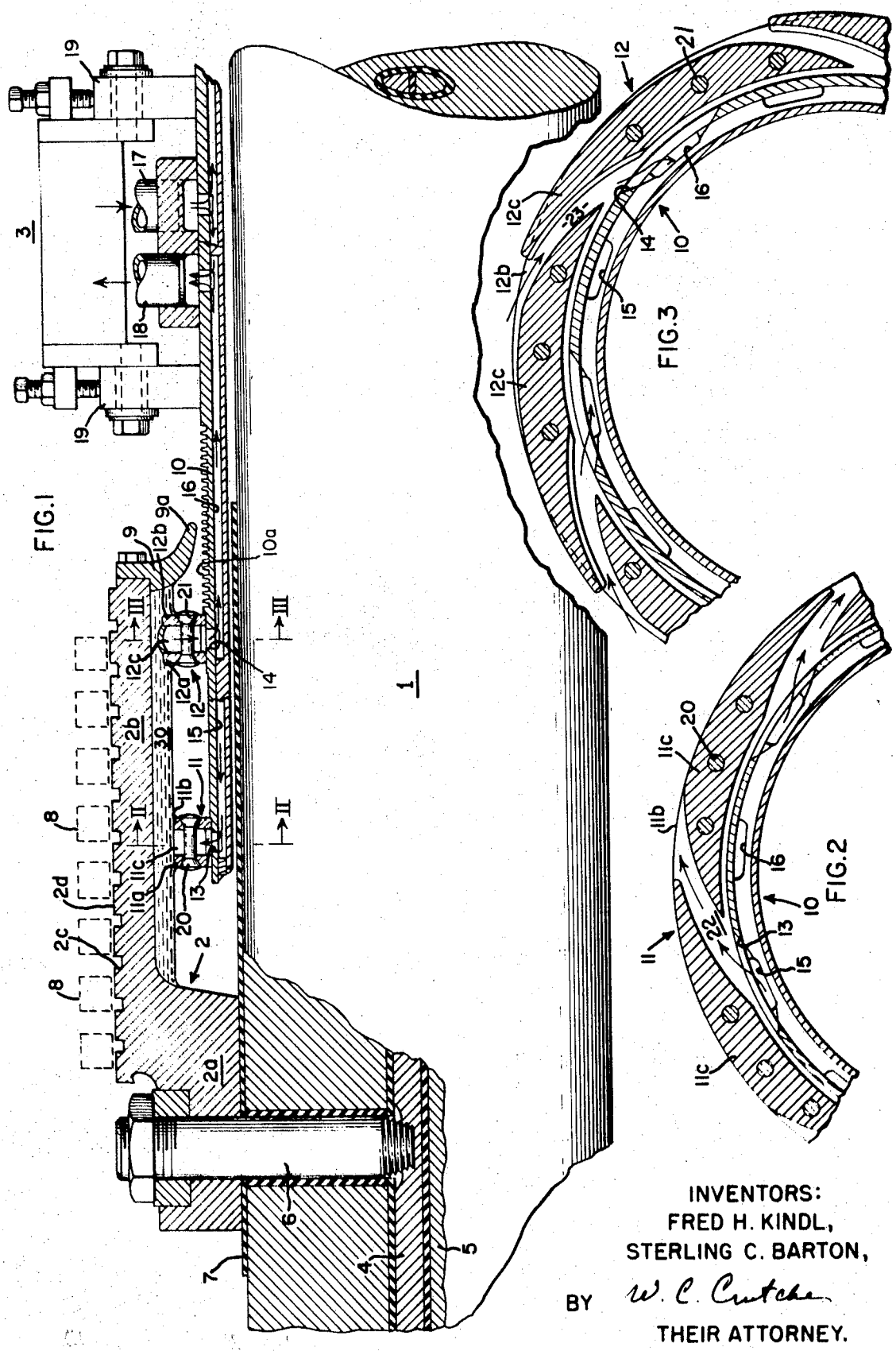
INVENTORS:
FRED H. KINDL,
STERLING C. BARTON,
BY W. C. Crutcher
THEIR ATTORNEY.

Patented May 18, 1971 3,579,006

INVENTORS:
FRED H. KINDL,
STERLING C. BARTON,

BY W. C. Crutcher

THEIR ATTORNEY.

LIQUID COOLED COLLECTOR RINGS FOR DYNAMOELECTRIC MACHINE

BACKGROUND OF THE INVENTION

This invention relates generally to the cooling of collector rings for dynamoelectric machines such as large turbine generators, and more particularly, to provision for liquid cooling of such rings.

Excitation current for the rotating field windings of large turbine generators is normally provided by means of carbon brushes in sliding contact with rotating collector rings on the turbine shaft. One limiting factor which determines brush life is the current density through the sliding contact area, and it is known that current density can be increased with better ring cooling.

It has been suggested in U.S. Pat. Nos. 3,145,314—Becker (1964) and 3,320,447—Banchieri (1967) that rotating electrically conductive rings can be cooled with liquid by means of passages in the rings which are part of a total closed liquid cooling circuit. However, closed liquid systems in rotating equipment are highly subject to leakage problems.

It has also been suggested in the prior art in U.S. Pat. No. 3,249,775—Baylac (1966) and in U.S. Pat. No. 3,296,470—Barbashev (1967) that the rotor windings themselves may be cooled with liquid which is fed from free jets into rotating cavities. These systems contemplate the supplying of a multiplicity of closed passages inside the winding copper and the rotating collecting chambers are merely distribution chambers rather than performing any cooling function themselves.

Cooling of collector rings presents a difficult problem, because the collector ring diameter cannot be increased without increasing brush-rubbing speeds. It is difficult to transmit cooling fluid through the many electrical connections which must be made between the field windings inside the sealed casing and the collector rings which are disposed outside the casing.

Accordingly, one object of the present invention is to provide an improved arrangement for liquid cooling dynamoelectric machine collector rings in a simple manner.

Another object of the invention is to provide an improved structure for supply and collection of liquid in order to cool a collector ring.

SUMMARY OF THE INVENTION

Briefly stated, the invention comprises collector rings with overhanging cylindrical portions adapted for brush sliding contact on the outer surfaces and with radial dams on the outer ends to provide freely rotating liquid cooling chambers on the inner collector surfaces. Liquid discharge and pickup rings of different radial diameters are carried on a shaft-enclosing sleeve and carry liquid to and from a central manifold by a self-pumping action.

DRAWING

The subject matter which is regarded as the invention is particularly pointed out and distinctly claimed in the concluding portion of the specification. The invention, however, both as to organization and the method of practice, together with further objects and advantages thereof, may best be understood by reference to the following description taken in connection with the accompanying drawing in which:

FIG. 1 is a horizontal elevation, partly in section, of a portion of a dynamoelectric machine shaft with liquid manifold and collector ring, only one such ring being shown for purposes of illustration.

FIGS. 2 and 3 are fragmental cross sections taken through Sections II-II and III-III respectively showing the liquid discharge and liquid collection ring details.

DESCRIPTION OF THE PREFERRED EMBODIMENT

Figure 4:
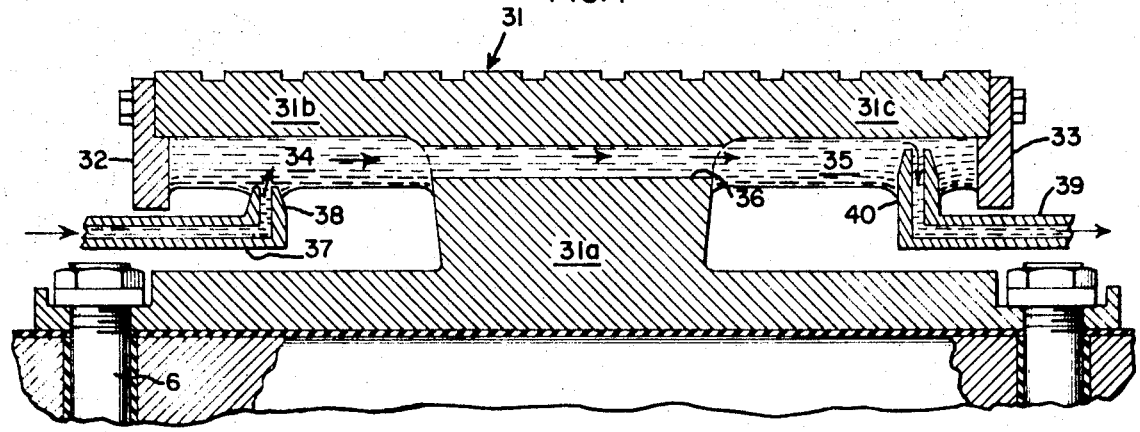
FIGS. 4 and 5 are schematic drawings of modified forms of the invention.

FIG. 1 shows a portion of a generator shaft 1 having a collector ring 2 thereon cooled by liquid supplied from a central manifold assembly 3. Another collector ring (not shown because of space limitations) is disposed upon the other side of manifold 3 and is identical to collector ring 2 except that it faces in the opposite direction.

Shaft portion 1 has a central insulated bore carrying the two insulated connection bars 4, 5, each of which is electrically connected to one of the two collection rings by means of one or two radially extending terminal studs such as 6. The connection bars 4, 5 may themselves be separately cooled by a fluid through constructions such as those illustrated in U.S. Pat. Nos. 3,393,333—Kudlacik (1968) or 3,353,043—Albright (1967).

The collector ring 2 includes a hub portion 2a mounted on the shaft and insulated therefrom by means of an insulating sleeve 7. Hub 2a supports an extending cylindrical overhanging portion 2b which, in a conventional manner, is provided on its outer surface with spiral grooves 2c separating the brush rubbing surfaces 2d. The brush outlines are indicated by reference numerals 8. The brush holder construction is not shown, but a suitable arrangement is shown in U.S. Pat. No. 3,387,155—Krulls (1968). The described construction is conventional except that the overhung collector ring portion 2b is much longer and thinner than in the prior art collectors.

In accordance with the invention, a contoured ring member 9 is attached to the end of the overhung collector portion 2b and extends radially inward towards shaft 1 to provide a liquid dam, thereby forming a rotating liquid chamber 30. Ring 9 is detachable in order to assemble the parts during construction. A double-wall sleeve 10 extends axially along the shaft and into the chamber 30 through the space between dam 9 and shaft 1. Circumferential teeth 10a are provided on the outside of the sleeve for some distance on either side of dam 9 in order to drain off any liquid on the sleeve.

On the sleeve 10 are mounted a liquid discharge ring 11 and a liquid pickup ring 12. The discharge ring 11 is mounted on top of circumferentially spaced liquid inlets 13 around the periphery of the sleeve and similarly, ring 12 is mounted to communicate with circumferentially spaced outlets 14 also spaced about the periphery but staggered with respect to inlet holes 13. Alternate axial passages 15, 16 in the sleeve communicate with inlets and outlets 13, 14 respectively.

The axial supply passages 15 are all fed from a fluid inlet supply manifold 17 connected to a source of cooled liquid with means to control the rate of flow (not shown). Similarly, the returning hot liquid from the passages 16 is collected by the manifold 18 and either discharged or recirculated through a cooling heat exchanger (not shown). The sleeve is supported at its center by means of a pair of rings 19, with means shown to adjust the rings so that the sleeve is concentric with the shaft. A similar sleeve extension runs in the opposite direction from the manifold assembly 3 and is constructed to be identical with sleeve extension 10.

The construction of discharge ring 11 and pickup ring 12 is similar. Ring 11 is made up of two solid rings 11a, 11b spaced by contoured segments 11c and held together by spaced rivets 20. Ring 12 has two solid rings 12a, 12b spaced by contoured segments 12c and held together by rivets 21.

Cross-sectional segments of rings 11, 12 are shown in FIGS. 2 and 3 respectively. Reference to FIG. 2 shows that the segments 11c are shaped and spaced from one another to define spiral discharge passages 22 which are aligned to register with inlets 13 communicating with the axial supply passages 15. Similarly, FIG. 3 indicates that the segments 12c are spaced and curved in opposite directions to define therebetween curved outlet passages 23 which communicate at their inner ends with outlets 14 and axial passages 16. The segments 11c and 12c serve to block alternating axial passages and provide access to alternating axial passages as indicated. In order to facilitate a self-pumping action of the liquid, the segments 12c of the pickup ring 12 extend inwardly beyond the solid supporting rings 12a, 12b on either side thereof as more clearly shown in FIG. 1. Also pickup ring 12 is located at a greater diameter than the discharge ring 11 to provide sufficient liquid so that the resultant liquid pressure will effect a self-pumping system.

OPERATION OF THE INVENTION

Cooled liquid flows from the inlet manifold 17 in both directions through the various axial flow passages 15 and is directed tangentially into the cup chamber 30 by means of the contoured outlets 22. Liquid covers the free surface of the interior of the collector extension 2b and cools the collector ring so that increased current transmission through the brushes is possible. Liquid is scooped up by ring 12 through the contoured inlet passages 23 which are curved in the opposite direction and is fed through the axial passages 16 to the outlet manifold. The difference in diameter between the discharge ring and the pickup ring creates a pressure head due to centrifugal force and causes the arrangement to be self-pumping.

It is characteristic of dynamoelectric machine rotors that the rotor (and attached collecting rings) exhibit considerable axial movement due to thermal expansion, whereas the liquid supply manifold assembly 3 and sleeves 10 are stationary. As the shaft 1 and collector ring 2 move due to thermal expansion of the rotor, the rings 11, 12 may travel over the interior of the free surface of liquid without interference.

MODIFICATIONS

Referring to FIG. 4 of the drawing, a modification is shown wherein the collector ring 31 has a central hub 31a and two overhanging end portions 31b, 31c. Rings 32, 33 are provided at either end to form two spaced rotating liquid chambers 34, 35 separated by holes 36 through the hub.

A liquid inlet sleeve 37 with discharge ring 38 of small diameter extends beneath the radial ring 32 on one end. On the other end, a liquid outlet sleeve 39 and attached pickup ring 40 of a greater diameter extends into liquid chamber 35.

As before, the difference in diameters of rings 38, 40 cause a self-pumping action from one chamber to the next.

Figure 5:
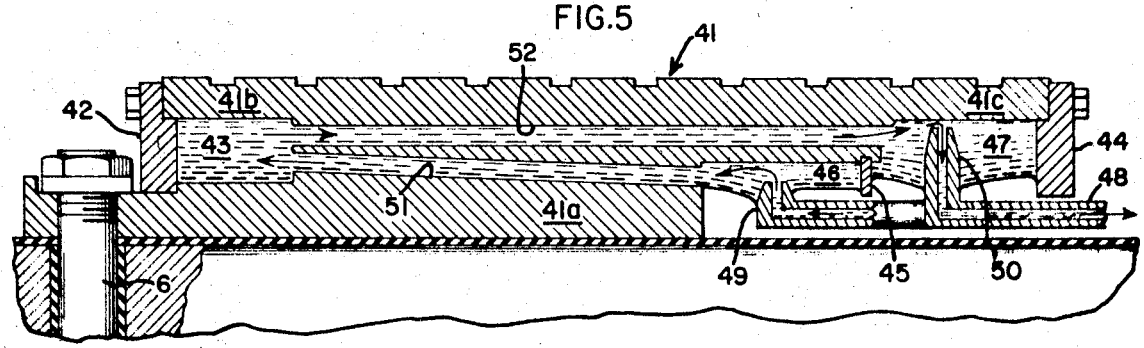

FIG. 5 shows yet another modification, wherein the collector ring 41 is arranged with a hub 41a, and extending portions 41b, 41c.

On the end where the terminal stud is disposed, a radial ring 42 seals off a liquid chamber 43. On the other end, rotating rings 44, 45 provide a rotating liquid inlet chamber 46 and liquid outlet chamber 47. A single sleeve 48 carries both the small diameter liquid discharge ring 49 and the larger diameter liquid pickup ring 50.

It remains to note that the rotating liquid chambers 46, 43, 47 are interconnected by passages 51, 52 extending back and forth axially through the hub 41a and connecting chambers 43, 46 and 47 so as to provide complete liquid cooling of the collector ring.

In FIGS. 4 and 5, the liquid discharge rings and liquid pickup rings may or may not include contoured passageways as shown in the primary arrangement disclosed in FIGS. 1—3.

While there has been shown what is considered to be the preferred embodiment of the invention and two modifications, it should be apparent that for some designs, one or the other of the rings 11, 12 may be omitted. For example, in lieu of ring 11, liquid can be discharged directly from outlets 13 as free jets into the enclosure 10. Conversely, ring 12 can be omitted and a shorter dam 9 provided from which the liquid will overflow and be flung outwardly to a suitable collecting device. However, the arrangement shown in the preferred embodiment provides both supply and pickup rings in a simple construction with a minimum of splashing and undesirable escape of liquid.

Thus there has been described an improved collector cooling arrangement which is simple and which is not dependent upon the cooling system for the rotor windings themselves. Increased current density and brush life are obtained from the construction shown.

We claim:

1. In a dynamoelectric machine of the type having insulated collector rings attached to the shaft and electrically connected to leads within the shaft, the improvement comprising:
   an axially extending overhanging collector ring portion having an outer surface adapted for rubbing contact with brushes,
   a ring detachably secured to said overhanging portion and extending radially inward therefrom to provide a liquid dam, said overhanging ring portion and said dam defining a rotating chamber,
   a cylindrical sleeve surrounding said shaft and extending axially between the dam and the shaft into said chamber and defining a plurality of axial liquid supply and discharge passages,
   a liquid discharge ring disposed on the sleeve,
   a liquid pickup ring axially spaced from the discharge ring and disposed on the sleeve,
   said discharge and pickup rings defining a plurality of circumferentially spaced curved passageways respectively, curved in opposite directions to facilitate discharge and pickup of liquid from said chamber, the curved passages of the respective rings being arranged to communicate with alternating axial passages in the sleeve, and
   manifold means comprising a pair of annular chambers surrounding the sleeve and arranged to supply cooling liquid to one set of axial passages and to receive liquid from another set of axial passages.

2. In a dynamoelectric machine of the type having insulated collector rings attached to the shaft and electrically connected to leads within the shaft, the improvement comprising:
   at least one axially extending overhanging collector ring portion having an outer surface adapted for rubbing contact with brushes,
   at least one rotating ring attached to said overhanging portion and extending radially inward therefrom to provide a liquid dam,
   at least one stationary sleeve portion extending between said dam and said shaft defining axial passages for liquid flow,
   a liquid supply means, communicating with said axial passages in said sleeve, including a smaller diameter stationary discharge ring member extending radially outward from the sleeve, beyond the inner diameter of the liquid dam providing a flow of cool liquid into the interior of said overhanging portion,
   a liquid collection means including a larger diameter stationary pickup ring member extending radially outward from the sleeve, beyond the inner diameter of the liquid dam, providing liquid pickup passages communicating with said axial passages in the sleeves.

3. The combination according to claim 2 wherein there are two of said overhanging collector ring portions extending in opposite directions from a central hub; wherein there are two of said rotating rings, one attached at each extremity of each overhanging collector ring, forming two spaced rotating liquid dams in communication with each other by holes through the central hub; wherein there are two of said stationary sleeve portions, extending in opposite directions, one on each side of the hub; and wherein said liquid supply means is on one side of the hub communicating with one sleeve and said liquid collection means is disposed on the other side of the hub, communicating with the other sleeve.

4. The combination according to claim 2, wherein a second rotating ring is attached inside said collector ring overhanging portion to provide a second liquid dam so as to separate first and second rotating liquid chambers, said collector having a body portion defining axial passages from one end of the collector to the other connecting the first and second chambers, and wherein said stationary rings of the liquid supply means and the liquid collection means extend into the first and second liquid chambers respectively.

5. The combination as recited in claim 2, wherein the liquid discharge ring and the liquid pickup ring are comprised of contoured segments defining curved passages which facilitate the discharge and pickup of the cooling liquid.